United States Patent [19]

Matsushita et al.

[11] Patent Number: 4,486,696
[45] Date of Patent: Dec. 4, 1984

[54] STEPPING MOTOR DRIVING CIRCUIT

[75] Inventors: Tsuyoshi Matsushita; Makoto Takahashi; Kazuaki Takaishi, all of Shizuoka, Japan

[73] Assignee: Tokyo Electric Co., Tokyo, Japan

[21] Appl. No.: 508,066

[22] Filed: Jun. 24, 1983

[30] Foreign Application Priority Data

Aug. 30, 1982 [JP] Japan ................. 57-150209

[51] Int. Cl.$^3$ ............................ H02K 29/04
[52] U.S. Cl. ........................ 318/696; 318/685
[58] Field of Search ........... 318/696, 685; 361/152, 361/11

[56] References Cited

U.S. PATENT DOCUMENTS 4,129,816 12/1978 Feldy et al. ................. 318/696
4,164,697 8/1979 Everett ..................... 318/696

FOREIGN PATENT DOCUMENTS 55-133700 10/1980 Japan.
56-117598 9/1981 Japan.

*Primary Examiner*—J. V. Truhe
*Assistant Examiner*—Saul M. Bergmann
*Attorney, Agent, or Firm*—Frishauf, Holtz, Goodman & Woodward

[57] ABSTRACT

A stepping motor driving circuit includes a plurality of switching transistors having their emitter-collector paths connected to the corresponding ends of motor coils, a plurality of diodes having their anodes connected to the above-mentioned ends of the motor coils and their cathodes connected to a common terminal, and a braking circuit connected between the cathode of the diodes and the other end of the motor coils, in which the switching transistors are sequentially turned ON to permit excitation currents to pass through the corresponding motor coils. The braking circuit has a variable effective impedance.

10 Claims, 11 Drawing Figures

STEPPING MOTOR DRIVING CIRCUIT

BACKGROUND OF THE INVENTION

This invention relates to a stepping motor driving circuit.

A stepping motor driving circuit is known which has a resistor or a zener diode connected in parallel with each coil of a stepping motor through a diode and functioning as a braking element. In the driving circuit using the resistor as a braking element, if a resistive value of the braking resistor is increased, a transient current which flows through the motor coil is rapidly attenuated at the final phase of each stepping motion, permitting the stepping motor to be stably driven by a high frequency drive pulse. In this case, however, it is possible to obtain only a small braking force. Where the motor is to be driven in a stepping fashion or a low frequency drive pulse is used, the motor will be driven with vibration in each step. If the resistive value of the braking resistor is decreased, the motor is smoothly driven, but it would be difficult to drive the motor with a high frequency drive signal.

Even in the driving circuit using the zener diode as the braking element, the frequency response characteristic of the motor is varied depending upon the magnitude of the zener voltage of the zener diode. Thus, the same problem as mentioned above arises.

In an electronic printer, etc. it is necessary to smoothly brake a stepping motor without causing vibration after it has been driven a required number of steps at high speed. The demand for such a stepping motor driving circuit has been growing steadily.

SUMMARY OF THE INVENTION

It is accordingly the object of this invention to provide a stepping motor driving circuit which can stably drive a stepping motor with high reliability.

This object is attained by a stepping motor driving circuit having a braking circuit connected in parallel with each coil of a stepping motor through a diode and having a variable effective impedance.

According to this invention, since the braking circuit having a variable effective impedance is used, the stepping motor can be driven in stepping fashion at high speed by setting the effective impedance at a high level. If the effective impedance is set at a low level, the stepping motor can be stopped without involving vibrations or can be driven in a stepping fashion at low speed.

DETAILED DESCRIPTION OF THE PREFERRED EMBODIMENT

Figure 1:
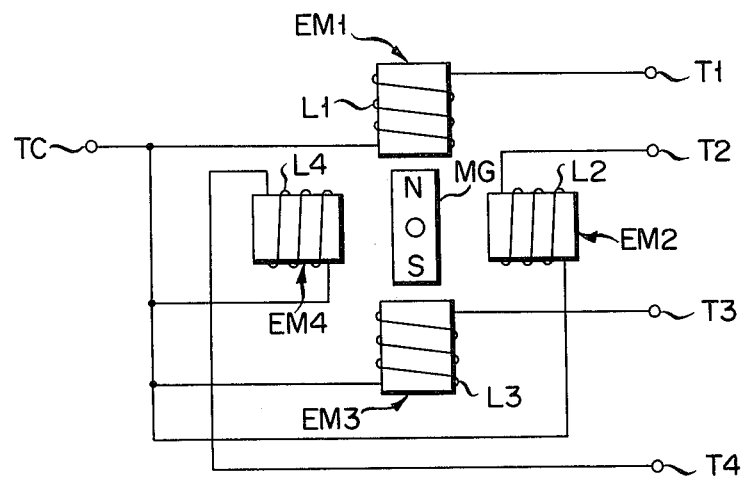
FIG. 1 is a diagrammatic view showing a stepping motor driven by a stepping motor driving circuit according to the embodiment of this invention.

FIG. 1 is a diagrammatic view showing a stepping motor. The stepping motor has a rotor MG comprised of a permanent magnet and four electromagnets EM1 to EM4 arranged at intervals of 90° around the rotor MG. The electromagnets EM1 to EM4 have motor coils L1 to L4, respectively, connected at one end to a common terminal TC and at the other end to terminals T1 to T4, respectively.

Figure 2:
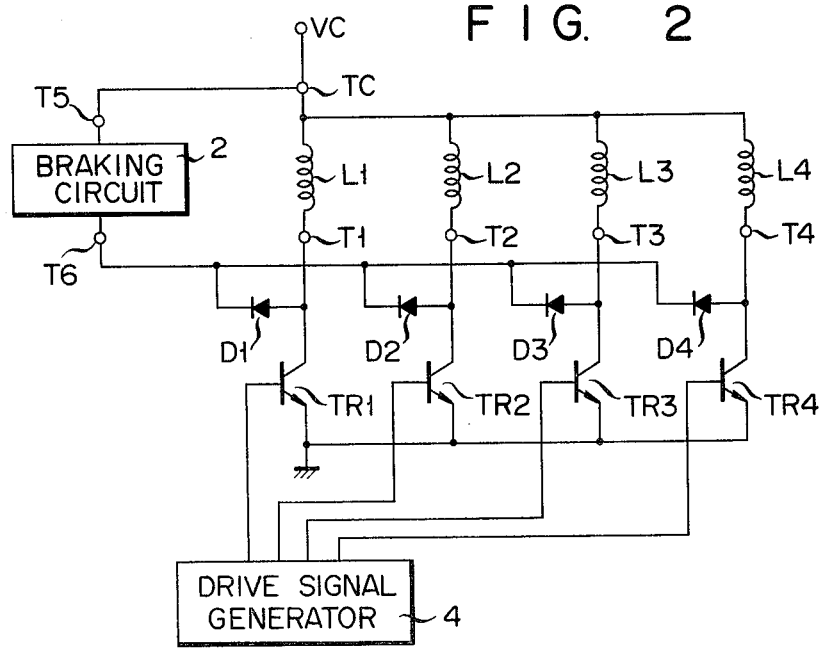
FIG. 2 is a circuit diagram showing the stepping motor driving circuit of this invention which is connected to the stepping motor shown in FIG. 1.

FIG. 2 is a circuit diagram showing a stepping motor driving circuit according to one embodiment of this invention which is connected to the motor coils L1 to L4. The driving circuit includes npn transistors TR1 to TR4 whose collectors are connected to the terminals T1 to T4, respectively, and whose emitters are connected to ground, a braking circuit 2 having one terminal connected to a common terminal T5 and the other terminal T6 connected to the terminals T1 to T4, through respective diodes D1 to D4, and a drive signal generator 4 for supplying drive signals S1 to S4 to the bases of the transistors TR1 to TR4, respectively. It is to be noted here that the common terminal TC of the motor coils L1 to L4 is connected to a power source terminal VC.

Figure 3:
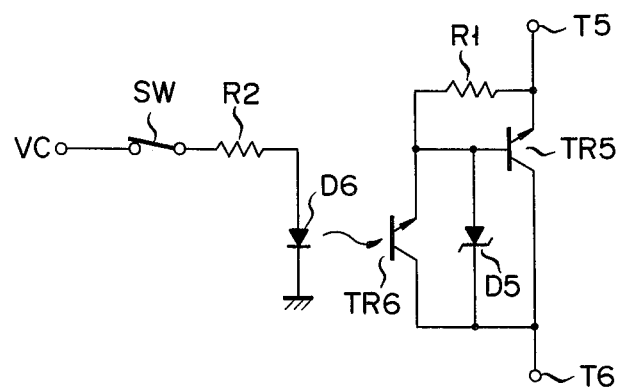
FIG. 3 is a circuit diagram showing one form of a braking circuit as used in the stepping motor driving circuit of FIG. 2.
Figure 4A:
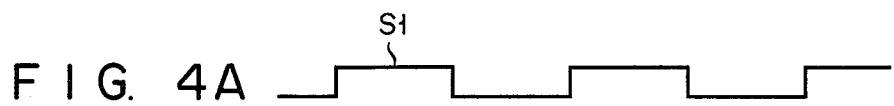
FIGS. 4A to 4H are signal waveform diagrams for explaining the operation of the stepping motor driving circuit shown in FIGS. 2 and 3.
Figure 4B:
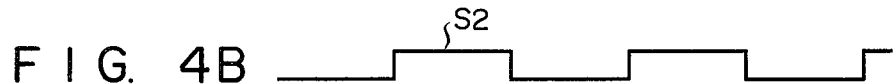
Figure 4C:
Figure 4D:
Figure 4E:
Figure 4F:
Figure 4G:
Figure 4H:

The braking circuit 2 includes, as shown in FIG. 3, an npn transistor TR5 having its emitter and collector connected to the terminals T5 and T6, respectively, a resistor R1 connected between the base and emitter of the transistor TR5, a zener diode D5 having its anode and cathode connected to the base and collector, respectively, of the transistor TR5, and an npn phototransistor TR6 having its emitter and collector connected to the base and collector, respectively, of the transistor TR5. The phototransistor TR6 constitutes a photocoupler together with a light emitting diode D6 having its anode connected through a resistor R2 and switch SW to a power source terminal VC and its cathode connected to ground. The switch SW has its switching position controlled in response to a control signal from, for example, an external control circuit (not shown).

With the switch SW in the ON state, a current flows through the switch SW and resistor R2 into the light emitting diode D6 to permit the diode D6 to emit light. As a result, the transistor TR6 is turned ON, short-circuiting the base-collector path of the transistor TR5. A voltage equal to the contact potential of the diode occurs between the terminals T5 and T6.

The attenuation factor of a transient current through one of the motor coils L1 to L2 becomes smaller at a final phase of each stepping motion. Thus, residual magnetization resulting from the transient current is continuously created, producing a greater braking force.

With the switch SW in the OFF state, no current flows through the light emitting diode D6 and the phototransistor TR6 is rendered nonconductive. If, under this condition, a voltage greater than a sum of a zener voltage VZ of the zener diode and base-emitter voltage $V_{BE}$ of the transistor TR5 is developed between the terminals T5 and T6, the transistor TR5 is rendered conductive. A surge voltage developed in one of the motor coils L1 to L4 can be suppressed at the final phase of the stepping motion by setting the zener voltage VZ of the zener diode D5 at a proper level. In this case, the attenuation factor of a transient current through the motor coil increases, and thus the residual magnetization is rapidly attenuated, resulting in a smaller braking force.

An effective impedance between the terminals T5 and T6 varies depending upon the ON or the OFF state of the switch SW. Where the rotor MG is to be driven in stepping fashion at high speed, it is only necessary to increase an effective impedance between the terminals T5 and T6 with the switch SW in the OFF state. On the other hand, where the rotor MG is to be driven in stepping fashion at low speed or is to be stopped, it is only necessary that the impedance between the terminals T5 and T6 be increased with the switch SW in the ON state.

The operation of the stepping motor driving circuit when the rotor MG is driven only a required number of steps at high speed by the stepping motor driving circuit (FIGS. 2 and 3) will be explained below by referring to FIGS. 4A to 4H.

The drive signal generator 4 supplies drive signals S1 to S4 as shown in FIGS. 4A to 4D to the bases of the transistors TR1 to TR4 in response to energizing signals from, for example, the external control circuit (not shown), thus controlling the conduction state of these transistors. As evident from FIGS. 4A to 4D, the drive signal S1 has phase differences of 90°, 180° and 270° with respect to the drive signals S2, S3 and S4, respectively. The transistors TR1 to TR4 are rendered conductive in response to the drive signals S1 to S4 of the drive signal generator 4, causing excitation currents as shown in FIGS. 4E to 4H to flow through the motor coils L1 to L4. That is, each time one of the drive signals S1 to S4 becomes high, the rotor MG is driven at steps of 90° in synchronism with the drive signal.

As indicated by the solid lines in FIGS. 4E to 4H, with the switch SW in the OFF state, the transient current through one of the motor coils L1 to L4 is rapidly attenuated at the final phase of each stepping motion and, as indicated by the broken lines in FIGS. 4E to 4H, with the switch SW in the ON state the transient current is slowly attenuated. Thus, the stepping motor can be stably rotated at high speed by the driving circuit shown in FIGS. 2 and 3. Where the rotor MG is rotated, for example, an N number of steps, an energizing signal is supplied from the external control circuit (not shown) to the drive signal generator 4 over a period corresponding to the N number of steps, and at the same time the switch SW is set at the OFF state by a first-level control signal from the external control circuit. As a result, the rotor MG is driven in stepping fashion at high speed. A surge current developed in the motor coil is suppressed by the braking circuit 2 to a sufficiently small value. When the rotor MG is subsequently rotated by (N−1) steps, the switch SW is set at the ON state by a second-level control signal from the external control circuit. When the final stepping motion is completed, the transient current through one of the motor coils L1 to L4 is slowly attenuated, thus imparting a relatively great braking force to the rotor. In this way, the rotor MG is driven in stepping fashion at high speed and can be braked without causing vibrations.

Where the rotor MG is to be driven in stepping fashion at low speed, it is only necessary that, with the switch SW in the ON state, drive signals of longer periods be delivered from the drive signal generator 4.

Although this invention has been explained in connection with one embodiment of this invention, it is not restricted to this embodiment. In the control circuit as shown in FIG. 3, for example, the light emitting diode D6 and phototransistor TR6 are used to electrically separate a circuit section including the switch SW from a circuit section including the transistor TR5. Alternatively, an ordinary transistor can be used in place of the phototransistor and, in this case, the ON state of the transistor can be controlled by a voltage divider circuit comprised of a series circuit of a switching element and resistors.

Although a four-phase stepping motor is shown in FIG. 1, a two or more phase stepping motor can be used instead.

What is claimed is:

1. A stepping motor driving circuit comprising:
   a plurality of switching means connected to first ends of a corresponding number of motor coils of a stepping motor to be driven;
   control means for controlling the conduction states of said plurality of switching means to permit excitation currents to sequentially pass through the motor coils over a predetermined period of time;
   a plurality of unidirectional circuit means, each unidirectional circuit means including a diode, each diode being respectively connected at one end to said first ends of the corresponding number of the motor coils and connected at the other end to a common terminal; and
   braking means connected between second ends of the motor coils and said other ends of said diodes of the unidirectional circuit means and having a variable effective impedance, said braking means comprising:
     a transistor having its emitter-collector path connected between said second ends of the motor coils and said other ends of said diodes of the unidirectional circuit means;
     resistor means connected between the emitter and the base of said transistor;
     constant voltage means connected between the base and the collector of said transistor; and
     a switching circuit connected in parallel with the constant voltage means.

2. A stepping motor driving circuit according to claim 1, in which each of said switching means comprises a transistor whose emitter-collector path is connected in series with the corresponding one of said plurality of motor coils.

3. A stepping motor driving circuit according to claim 1, in which said switching circuit comprises a phototransistor having its emitter-collector path connected in parallel with said constant voltage means, a light emitting diode for emitting light to the base of the phototransistor, and current supply means for selectively supplying a current to the light emitting diode.

4. A stepping motor driving circuit according to claim 3, in which said constant voltage means comprises a zener diode.

5. A stepping motor driving circuit according to claim 1, in which said constant voltage means comprises a zener diode.

6. A stepping motor driving circuit according to claim 1, wherein the anodes of said diodes are respectively connected to said first ends of the corresponding number of the motor coils, and wherein the cathodes of said diodes are connected to said common terminal, said transistor of said braking means having its emitter-collector path connected between said second ends of the motor coils and cathodes of said diodes.

7. A stepping motor driving circuit according to claim 6, wherein said transistor 1 of said braking means has its emitter-collector path connected between said second ends of said motor coils and said common terminal.

8. A stepping motor driving circuit according to claim 1, wherein said braking means is connected between said second ends of the motor coils and said common terminal.

9. A stepping motor driving circuit according to claim 8, wherein said one end of each of said diodes is the anode end of said diodes, and wherein said other end of each of said diodes is the cathode end of said diodes.

10. A stepping motor driving circuit according to claim 1, wherein said one end of each of said diodes is the anode end of said diodes, and wherein said other end of each of said diodes is the cathode end of said diodes.

* * * * *